United States Patent [19]

Grossman et al.

[11] 3,710,029

[45] Jan. 9, 1973

[54] SWITCHING ARRANGEMENT FOR A DATA PROCESSING INSTALLATION

[75] Inventors: Gunter Grossman; Hans-Ulrich Moder; Rolf Schubert, all of Munich, Germany

[73] Assignee: Siemens Aktiengesellschaft, Berlin and Munich, Germany

[22] Filed: Jan. 6, 1971

[21] Appl. No.: 104,275

[30] Foreign Application Priority Data

Jan. 8, 1970 Germany ....................P 20 00 608.0

[52] U.S. Cl. ............179/18 ES, 179/18 J, 340/147 P

[51] Int. Cl. ............................................H04m 3/00

[58] Field of Search ..........................179/18 ES, 18 J

[56] References Cited

UNITED STATES PATENTS 3,478,173 11/1969 Lapsevskis et al. ...............179/18 ES 3,585,306 6/1971 Battocletti .......................179/15 AQ

FOREIGN PATENTS OR APPLICATIONS 1,292,210 4/1969 Germany .........................179/18 ES

*Primary Examiner*—Donald J. Yusko

*Attorney*—Birch, Swindler, McKie & Beckett

[57] ABSTRACT

A program controlled data processing installation is disclosed including program control units for carrying out the necessary system operations and memory storage devices for storing the necessary programs. The program control unit includes primary registers and an auxiliary storage unit including secondary registers to which immediate access is not required. The auxiliary storage unit is connected to the primary registers so that operations required by system commands may be carried out.

12 Claims, 6 Drawing Figures

SWITCHING ARRANGEMENT FOR A DATA PROCESSING INSTALLATION

BACKGROUND OF THE INVENTION

This invention pertains to a switching arrangement for an information processing installation, especially a telephone exchange installation, including a program control unit comprising multiple storage registers and a storage unit which contains the data and programs necessary for the operation of the installation.

Prior art information processing installations and especially telephone exchange installations have been constructed as program controlled systems. Installations of this type include a line connection unit, at least one program control unit and a command unit over which operators have access to the system. If within such a system two simultaneously operating program control units are utilized, then when one of the program control units breaks down the other can take over its tasks, but with a diminished speed of operation of the system. The programs to be carried out by the program control units are normally stored in duplicate memory storage units for reasons of safety.

For carrying out standard commands, organization commands, and wired special commands, the program control requires a series of registers, whose arrangement and interconnection determines the necessary technical switching expense and the working speed of the program control. It is possible to incorporate in a given cell of the storage unit registers which are not required for each command — for example, multiple purpose registers and masking registers — and to build into the program control only the most commonly required registers — for example the accumulator and the command counter register. However, this would be very expensive and a poor solution. All commands which pertain to a register in the storage unit would require additional storage cycles and thereby periodically encumber the storage and the program control. The capacity of the installation would thereby be undesirably decreased. If on the other hand, one includes all registers having individual trigger stages in the program control, then the register contents are immediately accessable without a storage cycle. In this case, however, the circuitry expense is quite high.

SUMMARY OF THE INVENTION

An object of this invention is to provide a register arrangement which avoids the described disadvantages.

In a switching installation according to this invention registers within a program control unit to which simultaneous access is not necessary are combined in an auxiliary storage unit so that each storage cell receives the contents of a register. This auxiliary storage unit is connected to the program control unit and is connected with registers within the program control unit to provide the elementary operations which are necessary for carrying out commands.

BRIEF DESCRIPTION OF THE DRAWINGS

The invention will be hereafter explained with reference to the figures.

DESCRIPTION OF PREFERRED EMBODIMENTS

Figure 1:
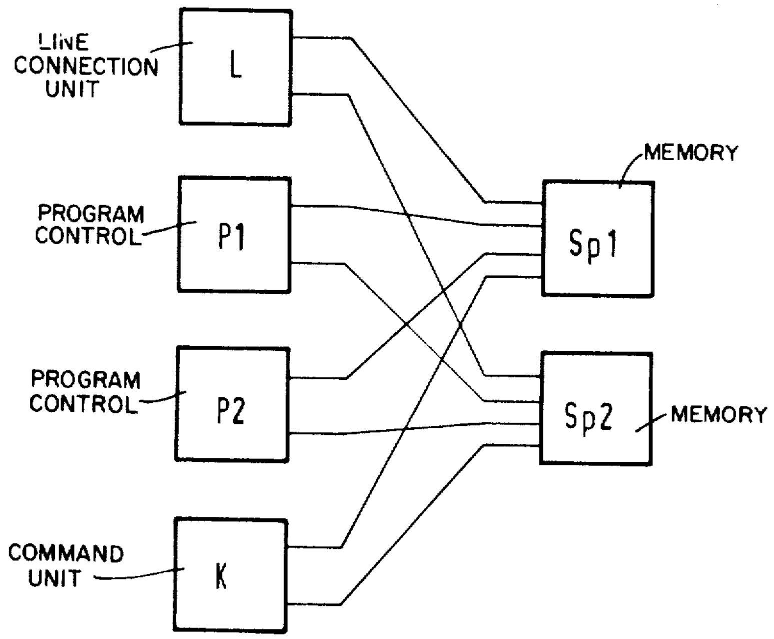
FIG. 1 shows an information processing installation in which this invention may be used.

The information processing installation of FIG. 1 is a program controlled system including a line connection unit L, program control units $P_1$ and $P_2$ and a command unit K over which operators have access to the system. The programs to be carried out by the program control units $P_1$ and $P_2$ are stored in duplicate memory units $Sp_1$ and $Sp_2$ for reasons of safety.

Figure 2:
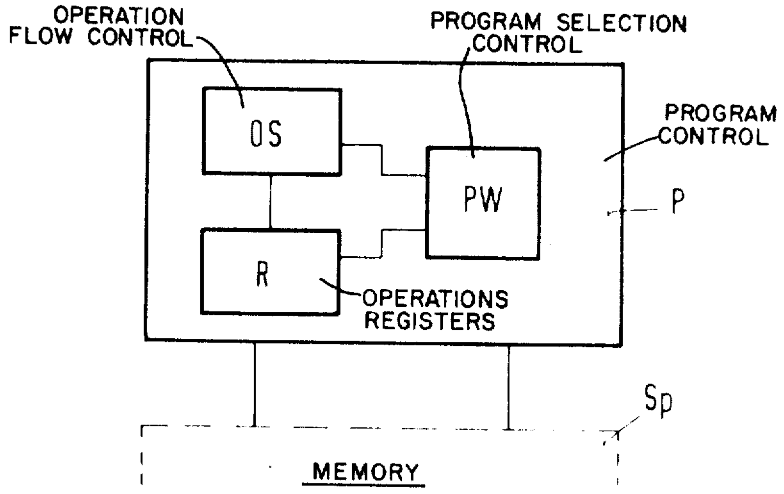
FIG. 2 shows the block circuit diagram of a program control unit of the system of FIG. 1.

As shown in FIG. 2, the program control unit of this invention includes elementary operations registers R, an operation flow control OS and a program selection control PW. The operation flow control OS controls the program control unit P in response to commands from a command decoder (not shown). The program selection control PW selects one of many programs which may be called for simultaneously to be carried out. Therefore, it must decide which programs of high priority can interrupt programs of lower priority. The present invention pertains to the elementary operations registers and their interconnections.

Figure 3A:
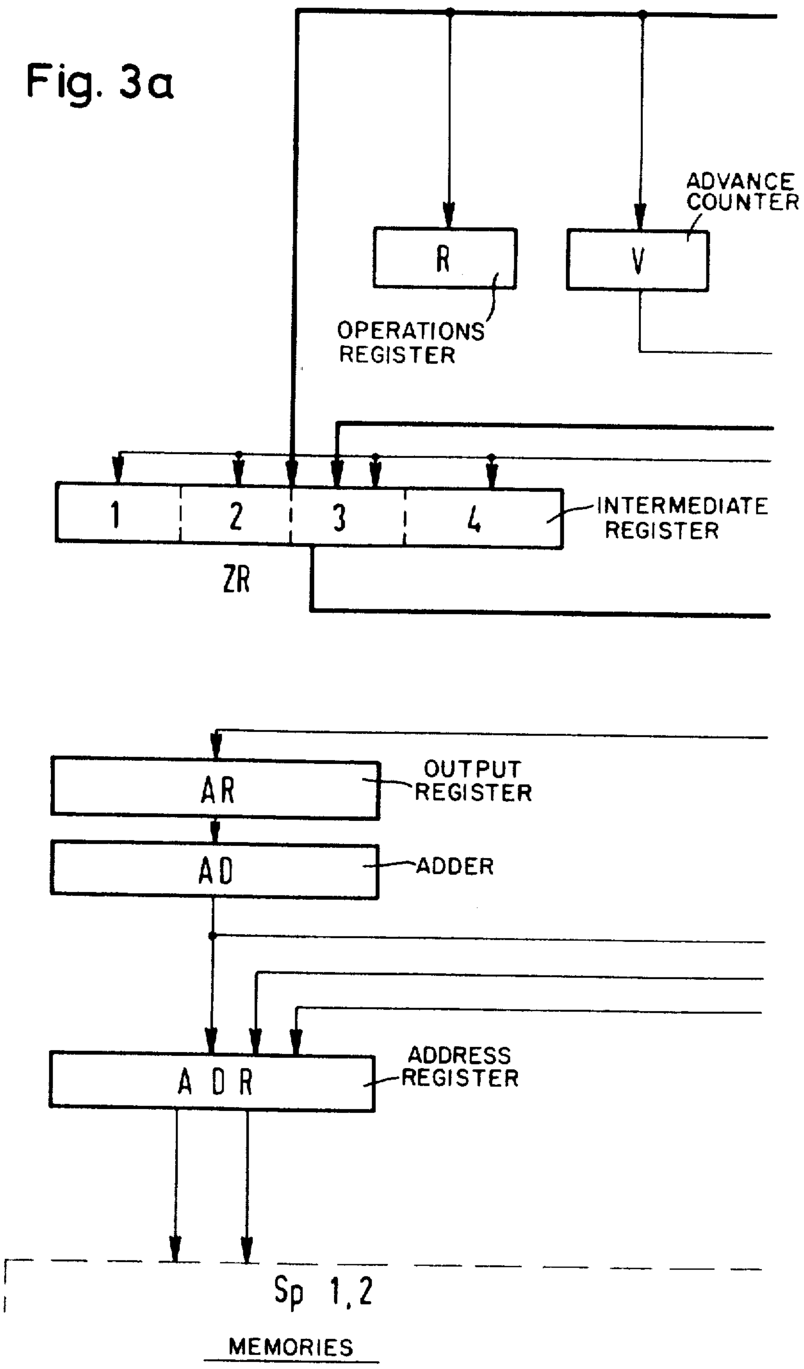
FIGS. 3a and 3b show the registers utilized for elementary operations of the program control unit of this invention and their interconnections.
Figure 3B:
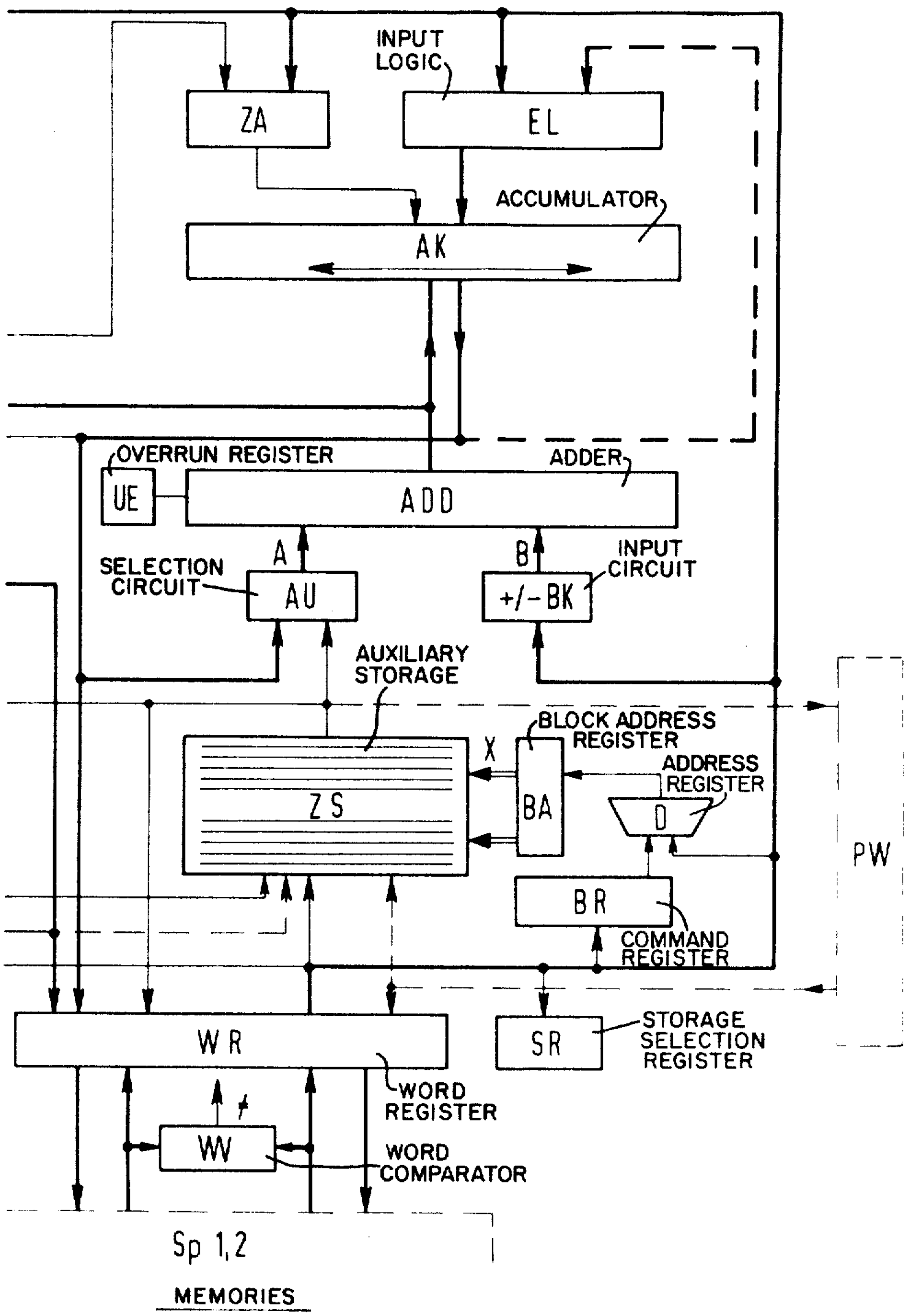

FIG. 3 is divided into the FIGS. 3A and 3B, of which figure 3B connects with the right of FIG. 3A. The same is true of FIGS. 4A and 4B. The two memory or storage units $Sp_1$ and $Sp_2$ are shown at the bottom of FIG. 3. The addresses for the selection of a certain storage cell are contained in the address register ADR. An address — for example, the contents of the command counter register BR — is stored in the address register ADR until the storage unit accepts the address. The address register ADR receives from the "1" — adder AD the command address increased by "1", from the intermediate register ZR the indicated address and from the word register WR the substituted addresses. At any given time, the word which is to be written into the storage units $Sp_1$ and/or $Sp_2$, or the word which has been read is stored in the word register WR. The word register WR serves as an intermediate register in traffic with the two storage memories $Sp_1$ and $Sp_2$ and in carrying out steps within the program control P. It is therefore connected with most of the other registers. Connections having the length of a complete storage word — for example, 24 bits — are shown as thick lines; connections of less than word length — for example of address length, i.e., 15 bits — are shown by thin lines. Control leads from and to the operation flow control OS, by means of which the transmission paths between the registers are opened and closed, are not shown for the sake of clarity.

In case of simultaneous reading from both storage memories $Sp_1$ and $Sp_2$, the storage words read from the storage cells are compared to each other in the word compare WV. If a difference is found, there has been an error, which is reported by a signal to the operation running control OS. The storage selection register SR which is to be loaded over the word register WR thereby indicates what is to be taken from the storage. Two bits of the storage selection register SR indicate whether commands are to be read from storage $Sp_1$ or $Sp_2$ or from both storages simultaneously; two further bits determine whether data should be exchanged with only one of the two storages or with both at the same time.

One of the information inputs of the auxiliary storage ZS is connected to the word register WR. FIG. 3B shows the auxiliary storage ZS and its connections with the registers of the program control P. In this example the auxiliary storage is realized as a matrix storage device. It includes 16 storage cells, each having an address length of 15 bits. Each of these cells can be selected using coordinates $X_1$ through $X_4$ and $Y_1$ through $Y_4$. The contents of these storage cells can be read out without destruction, or changed. To carry out a change, the storage operations "write" and/or "erase" can be carried out. In the operations "and", "or", the contents of a cell of the auxiliary storage ZS are linked in the sense of the "logical and" or "logical or" with the contents of a register outside of the auxiliary storage.

The auxiliary storage ZS includes the following registers: seven multipurpose registers, two masking registers, two priority status registers, two command counter registers, two intermediate storage registers and the address part of the command register. Of these registers, the masking register and priority status register as well as one command counter register and the intermediate storage registers are utilized for organization commands, while the remaining registers are used to carry out standard commands. All of the multipurpose registers can be used for indexing, and address computing, and partially for the solution of special tasks. The masking registers make it possible to determine in which of a plurality of program control units a selected program should run. The masking registers can also be used to protect a program being run from interruption by certain other programs. For this purpose, the masking registers contain sample bits whose places in each case are assigned a certain priority. Each "1" stored in the masking register has the effect that programs having a priority assigned to this place may interrupt other programs. A priority status register stores the priority of a program currently running within the program control. This priority is to be compared with the priority of each later called up program. The result of the comparison determines whether the called up program has a higher priority than the currently running program and therefore may interrupt the running program. In the case of a program interruption, intermediate storage registers store the contents of otherwise occupied registers. The command counter register BR stores the cell address increased by one of the storage cell command address currently in process. At the end of a command, the command counter register BR is interrogated, its contents are transferred to the address register D, and the contents increased by one are written back in the auxiliary storage ZS. A further cell of the auxiliary storage ZS takes up the address part of the command when the given address must be retained while carrying out the command. The operating part of the command is in each case read by a previously designated register DR outside of the auxiliary storage and is decoded by a command decoder (not shown), which then controls the operation control OS. If the operating part of the command word — for example, the bits 18 through 21 of the command word — contains the address of a cell of the auxiliary storage ZS — then these are decoded in the address decoder D and transferred to the block address register BA. The storage cell is selected thereby using the coordinates X and Y as is usually done in a core storage device. Continuing the example, the address portion of a command is transmitted over the connection WR-ZS to the storage cell to which it is directed. In the same manner, the auxiliary storage ZS is addressed when a register contained therein is to be filled. The address decoder D has a second input through which the auxiliary storage ZS can be addressed directly from the word register WR avoiding command register BR. The address data of the requested cell in the auxiliary storage ZS is taken in this case from the index of the command word — for example, from bits 1 through 4 of the command word. The decoded address of the desired cell is transferred as described to the block address register BA and used for the selection of the addressed storage cell of auxiliary storage ZS. The contents of the selected storage cell are then added in the adder ADD to the address part of the command stored in the word register WR. For this purpose, it is routed to the adder ADD over a selection circuit AU; the command which is in the word register WR, is also routed to the adder ADD over input circuit BK.

In the adder ADD two 24-place binary numbers A and B can be added or subtracted. Thus A can be the contents of the accumulator AK (15 or 24 bits) or the contents of a cell of the auxiliary storage ZS (15 bits). B is the contents of the word register WR (15 or 24 bits). An addition overrun is indicated by the overrun register UE which is interrogated after the addition. The result of the addition is stored in the accumulator AK or in the intermediate storage ZR. In the case of an indication, the addition results are stored in the intermediate storage ZR. From there it is transferred to the word register WR, the address register ADR and to a call of the auxiliary storage ZS. In the last named case, for example, each cell is selected by means of the address given in the operating part of the command word. This cell then stores the address part of the command word. The direct connection between the intermediate register ZR and the auxiliary storage ZS, can, however, be omitted if time requirements allow. The contents of the intermediate storage are then transferred to the auxiliary storage ZS through the word register WR. For this reason the connection between the intermediate register ZR and the auxiliary storage register ZS is shown as a dotted line.

The result of the addition or subtraction between the contents of a cell of the auxiliary storage ZS and the contents of the word register WR can also be stored in the accumulator AK and be further processed therein. In the accumulator AK, a complete storage word of the program can be processed. The accumulator's contents can be shifted to the left or right, and are shifted around under the control of a shifting displacement counter which is divided into a forward and a backward counter. The logical connections AND, OR, and EXCLUSIVE OR between the contents of the accumulator AK and of the word register WR are provided by input logic EL arrayed between the accumulator and the word register. The dotted line connection between the accumulator output AK and input logic EL can be omitted if the accumulator is designed in accord with the disclosure in the German Pat. application No. P 18 00 948.8.

In any case, a sign selection circuit can select one of four signs in the contents of the word register WR or the advance counter V and transfer it into bits 10 through 15 of the accumulator AK. In this example, each storage word includes four signs, each having six bits. The sign which is in the bits 10 through 15 of the accumulator is stored in the four sign places 1 through 4 of the intermediate register ZR — the intermediate register then contains four identical signs — and can be transferred to the word register WR. Following the storage operation of "sign function writing" which has previously been described in the German Pat. application No. P 15 37 344.1, the sign is transferred to one of the four sign places of a storage cell. The "1" — adder AD is utilized to effect a rapid change of an address by "1". Its input is connected through the output register AR to the output of the auxiliary storage ZS. The output register are serves as an intermediate storage device to quickly free the auxiliary storage ZS after reading out the contents of a cell. An intermediate storage device is also necessary if the adder result is to be rewritten into the auxiliary storage ZS. The output register AR thereafter fulfills the task of a word register in the known core storage. The contents of the output register can thus be passed on unchanged, increased by "1", decreased by "1" or increased by "2".

In an alternative embodiment of the invention, it is also possible to establish a direct path from the auxiliary storage ZS to the address register ADR. As a result, an address does not have to first pass through the output register AR and the "1" — adder AD. This solution is preferable when the time requirements do not allow the address to be transferred unchanged through the "1" — adder AD.

A direct connection is also provided between the output of the auxiliary storage ZS and the word register WR. The contents of a cell of auxiliary storage ZS can be transferred to the storage Sp over this connection.

Figure 4A:
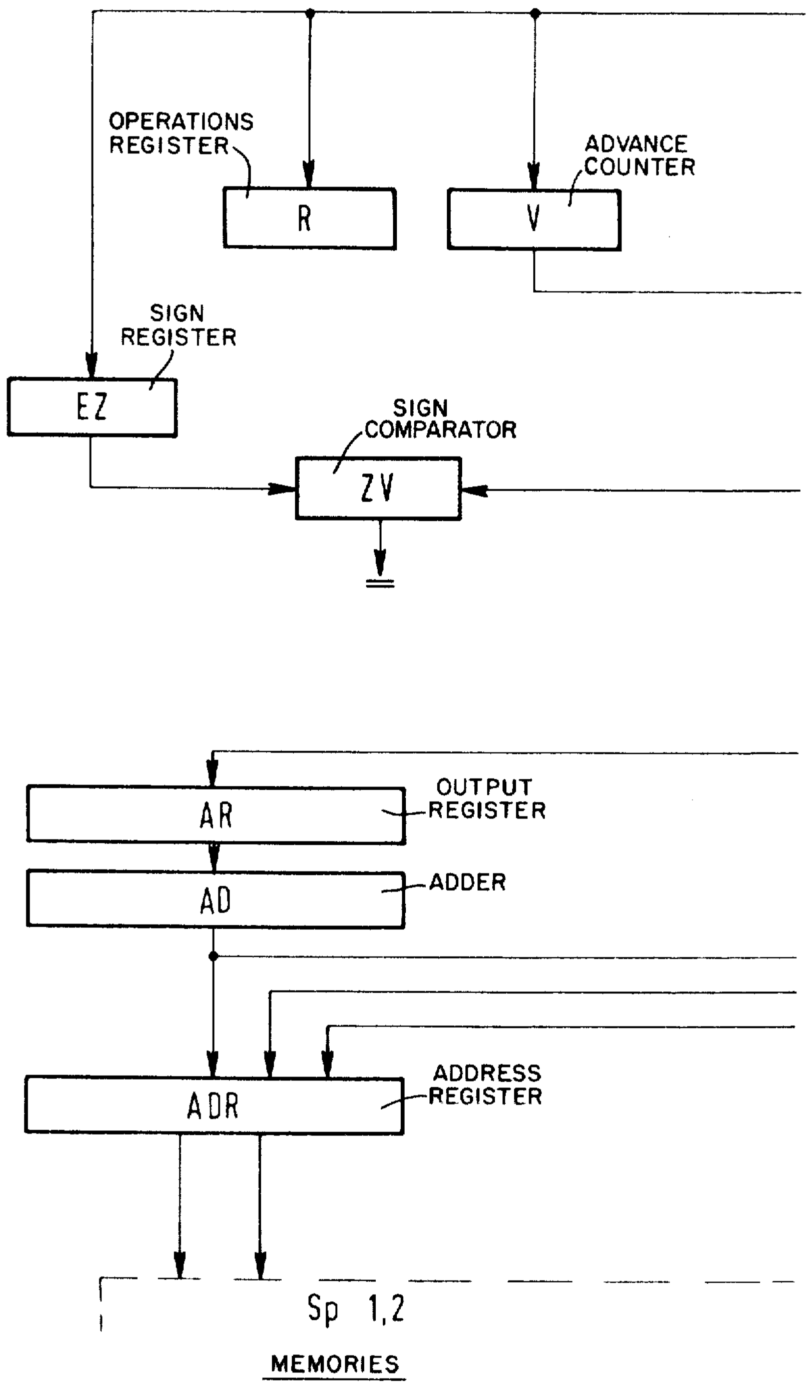
FIGS. 4a and 4b show an alternative embodiment of the register arrangement of FIG. 3 which is responsive to sign commands.
Figure 4B:
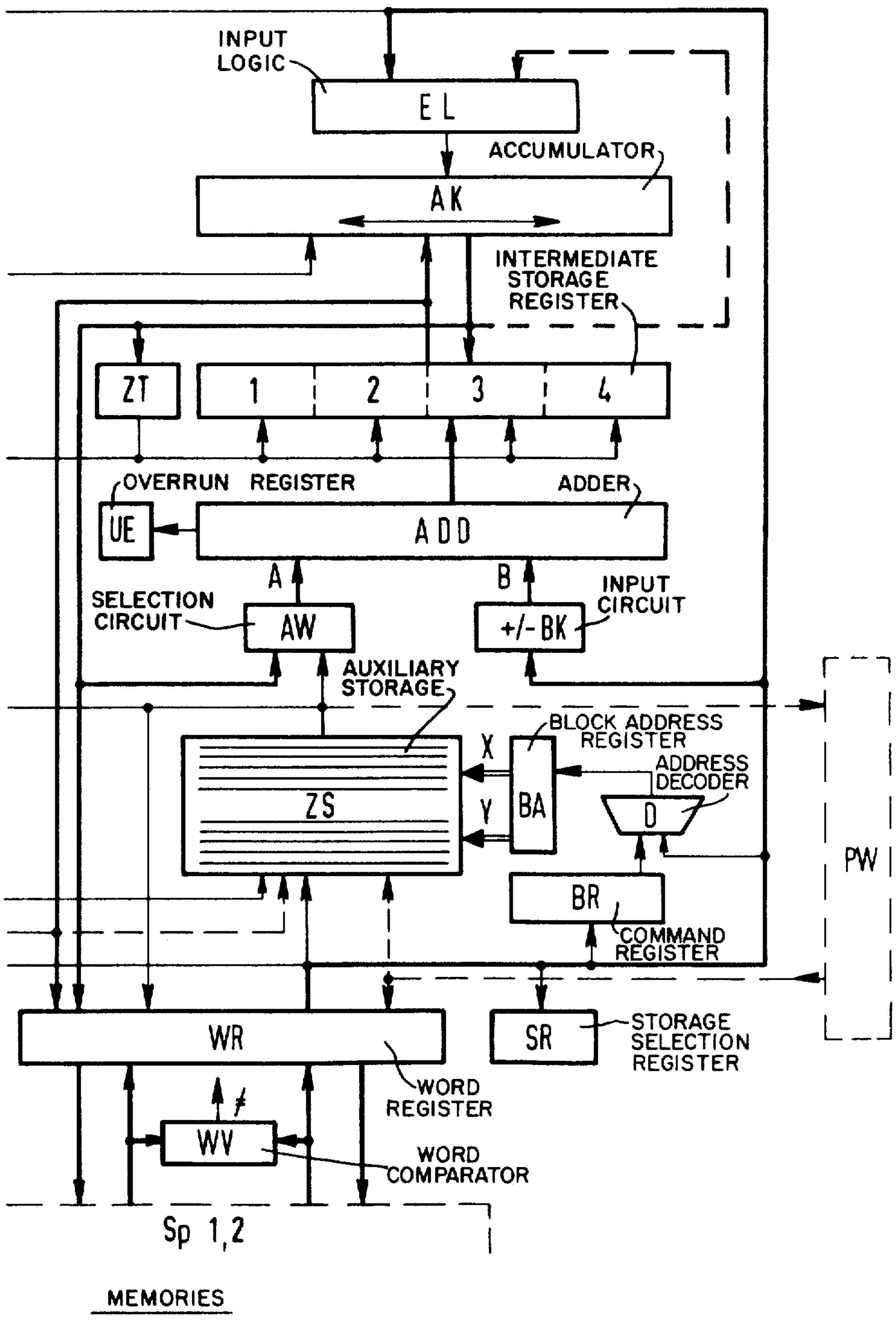

It is also within the scope of this invention, to adapt the intermediate storage register ZR so that the so called signed commands of the type described in the German Pat. application No. P 15 495 34.8, may be carried out. In these commands the operants are not complete storage words of for example, 24 bits, but rather signs of for example 6 bits. FIGS. 4A and 4B show an embodiment including the intermediate storage register ZR, to the output of which is connected a sign distributor ZT which receives four signs of six parallel bits from the accumulator and applies the signs in series to the intermediate register ZR. Thus in any given case, a sign can be transferred from one of the four signed places of the accumulator AK to one of the four signed places of the intermediate register ZR. If in a series of signs, a certain sign is to be detected (for example an end sign), then this sign is transferred to an end signed register EZ as disclosed in application No. P 15 49 534.8. Each sign which passes through the signed distributor, is compared in a sign comparison device ZV with the contents of the end signed register EZ. The sign comparison device ZV, upon detecting the same sign sends a signal to the operation flow control OS.

A further variation is possible within the scope of the invention. The working speed of the program control depends upon how often the program control must achieve access to the storage during a program. The larger the bank of registers available for the storage of the intermediate results, the fewer times the program control P must undertake a storage cycle. Where a sufficiently large bank of registers is used, data need be exchanged between the storage and the program control only at the beginning and end of a process. If multiple banks of registers are used, then the data which characterizes the momentary condition of a program can be stored in the program control even in case of a program interruption. The program control can then be simultaneously occupied by as many users or programs as there are banks of registers provided. The operation of information exchange from the storage to the program control and vice versa is then eliminated or can be consolidated in one large or in a plurality of small auxiliary storages.

We claim:

1. A data processing installation comprising:

a storage means for storing data and programs including program commands necessary for operation of the installation, and a program control unit including a plurality of primary registers and a first auxiliary storage unit including a plurality of secondary registers to which simultaneous access is not necessary, said auxiliary storage unit being connected to said primary registers so that elementary operations required by said program commands can be carried out.

2. A device as claimed in claim 1 wherein said auxiliary storage is a matrix storage device.

3. A device as claimed in claim 1 wherein said program control unit includes a second auxiliary storage means comprising a plurality of intermediate registers adapted to store the data of a program interrupted during processing.

4. A device as claimed in claim 1 where in said first auxiliary storage unit includes an address portion of a command register and a command counter register responsive to said command register to assign all storage in said auxiliary units to said commands.

5. A device as claimed in claim 1 including means for addressing storage cells of said auxiliary storage unit (ZS), said address register for addressing one of said cells, an address decoder (AD) controlling said block address register, and a command register (BR) for reading an operation part of one of said commands, the output of this command register being coupled through said address decoder to said clock address register.

6. A device as claimed in claim 5 including a word register (WR) coupled between said auxiliary storage unit and said address decoder and including means for transferring an output on an index register to said address decoder in response to an indication.

7. A device as claimed in claim 1 including means for effecting a rapid change of the cell storage address in said auxiliary storage comprising an output register (AR) connected to an output of the auxiliary storage (ZS) and adapted to serve as an intermediate storage device, an address register (ADR) for storing a cell storage address until requested by said auxiliary storage devise and a "1" adder device connected to the output of said output register and inputs of said auxiliary storage and said address register for effecting change in the cell address in said auxiliary storage device by "1".

8. A device as claimed in claim 1 including a word register (WR) for storing the command word being operated on, an adder (ADD) including a first input (B) connected through an input circuit (BK) to said word register, a second input (A) connected through a selection devise (AU) to a cell of said auxiliary storage unit (ZS) and means for summing the contents of said auxiliary storage unit cell and said word register, and means for storing the result of said addition including an accumulator (AK) and an intermediate register (ZR), the storage area depending on the result of said addition.

9. A device as claimed in claim 7 including a word register (WR) for storing the command word being operated on, an adder (ADD) including a first input (B) connected through an input circuit (BK) to said word register, a second input (A) connected through a selection device (AU) to a cell of said auxiliary storage unit (ZS) and means for summing the contents of said auxiliary storage unit cell and said word register, and means for storing the result of said addition including an accumulator (AK) and an intermediate register (ZR), the storage area depending on the result of said addition.

10. A device as claimed in claim 9 wherein said intermediate register (ZR) is directly connected with said address register (ADR) and said word register (WR) so that said output register (AR) and "1"—adder (AD) are bypassed.

11. A device as claimed in claim 9 wherein said intermediate register is directly connected to an information input of said auxiliary storage device (ZS).

12. A device as claimed in claim 10 including a sign distributor (ZT) for reading signs from said accumulator in parallel and applying the signs to an intermediate register in series, and wherein said intermediate register is coupled between an output of said adder (ADD) and an input of said accumulator (AK).

* * * * *